United States Patent [19]

Augustin et al.

[11] Patent Number: 4,617,354

[45] Date of Patent: Oct. 14, 1986

[54] ADHESIVE COMPOSITIONS WITH THERMOREVERSIBLE CROSSLINKING AND USES THEREFOR

[75] Inventors: Daniel Augustin, Bernay, France; Christian Leriche, Tokyo, Japan; Pierre Poisson, Bernay, France

[73] Assignee: Atochem, France

[21] Appl. No.: 694,223

[22] Filed: Jan. 24, 1985

[30] Foreign Application Priority Data

Jan. 31, 1984 [FR] France ................. 84 01436

[51] Int. Cl.$^4$ ........................... C08F 265/02
[52] U.S. Cl. .................. 525/301; 156/327; 525/297; 525/302; 525/312
[58] Field of Search .......... 525/312, 301, 297, 302; 156/327

[56] References Cited

U.S. PATENT DOCUMENTS

| | | | |
|---|---|---|---|
| 2,340,111 | 1/1944 | D'Alelio | 521/38 |
| 2,798,053 | 7/1957 | Brown | 526/271 |
| 2,858,281 | 10/1958 | Bauman et al. | 525/301 |

FOREIGN PATENT DOCUMENTS 45-21313  7/1970  Japan ................. 525/301

*Primary Examiner*—Wilbert J. Briggs, Sr.
*Attorney, Agent, or Firm*—Brooks Haidt Haffner & Delahunty

[57] ABSTRACT

Adhesive compositions with thermoreversible crosslinking resulting from the reaction of a divinyl ether having the formula $CH_2=CH-O-R-O-CH=CH_2$, R being aliphatic, aromatic or cycloaliphatic, with a copolymer resulting from the copolymerization of an olefin with an ethylenically unsaturated monocarboxylic acid and, optionally, an ester of an ethylenically unsaturated monocarboxylic acid, the proportion being 0.1 to 5 percent by weight of the divinyl ether to 99.9 to 95 percent by weight of the copolymer.

10 Claims, 3 Drawing Figures

ADHESIVE COMPOSITIONS WITH THERMOREVERSIBLE CROSSLINKING AND USES THEREFOR

BACKGROUND OF THE INVENTION

The present invention relates to novel adhesive compositions and their use, and more particularly, it relates to adhesive compositions which are thermoreversible, as evidenced by their decrease in viscosity at the thermoreversibility temperature.

It is known that compositions based on copolymers of ethylene with an ethylenically unsaturated carboxylic acid or compositions based on terpolymers of ethylene, ethylenically unsaturated carboxylic acid, and an ester of an ethylenically unsaturated carboxylic acid have good adhesive properties for various metals such as aluminum, steel, iron and for other substrates such as wood, leather, rubber, and ceramic materials.

THE INVENTION

It has been found according to the present invention that the adhesive properties of such compositions can be considerably improved by adding small quantities of compounds containing at least two vinyl ether functions in the molecule.

The divinyl ethers employed as adhesion promoters according to the invention have the general formula:

$$CH_2=CH-O-R-O-CH=CH_2$$

and can be obtained by any one of the known methods such as, for example, vinylation of glycols.

The invention is further described herein by reference to the accompanying drawings, wherein FIG. 1 is an illustration of an aluminum plate used to produce specimens for tensile testing;

Figure 1:
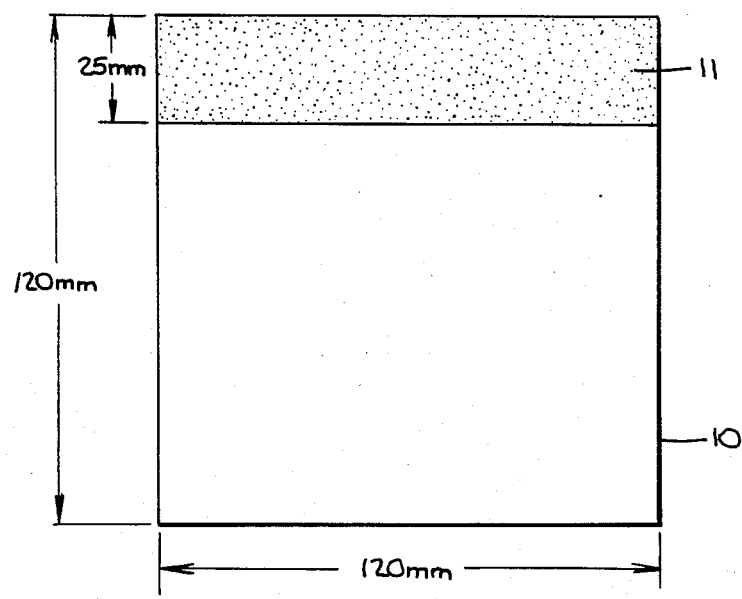

All parts, percentages, proportions, and ratios herein are by weight unless otherwise stated.

Information concerning the preparation of divinyl ethers is shown in Houben Weyl "Methoden der Organischen Chemie", 4th Ed., Vol. 6/3 p. 102 (Georg Thieme Verlag, Stuttgart 1965) and Peter Fischer "Enol Ethers-Structure, Synthesis and Reactions", Supplement E, "The Chemistry of Ether, Crown Ethers, Hydroxyl Groups and Their Sulphur Analogues", in Part 2, Patai (Editor), "The Chemistry of Functional Groups".

In the general formula above R is aliphatic, aromatic or cycloaliphatic, as for example:

—$(CH_2)_n$—, with n being one to six;
—$CH_2$—$CH_2$—O—$CH_2$—$CH_2$—;
—$CH_2$—$CH_2$—O—$CH_2$—$CH_2$—O—$CH_2$—$CH_2$—;
—$CH_2$—$CH_2$—O—$CH_2$—$CH_2$—O—$CH_2$—$CH_2$—O—$CH_2$—$CH_2$—;

$$-\underset{R_1}{\overset{R_1}{\bigcirc}}-Z-\underset{R_1}{\overset{R_1}{\bigcirc}}-,\text{ with Z being } -CH_2-,\ -\underset{CH_3}{\overset{CH_3}{C}}-,\ -\underset{Et}{\overset{H}{C}}-,$$

or $-\underset{Et}{\overset{CH_3}{C}}-$ and $R_1$ being H, $CH_3$—, or X, X being chlorine, bromine, or fluorine;

—⬡—

$X$—⬡— with X being chlorine, bromine, or fluorine;

$$-CH_2-CH_2O-\underset{R_1}{\overset{R_1}{\bigcirc}}-Z-\underset{R_1}{\overset{R_1}{\bigcirc}}-O-CH_2-CH_2-$$

with Z and $R_1$ having the same meanings as above;

$$-CH_2-CH_2-O-\underset{R_1\ R_1}{\overset{R_1\ R_1}{\bigcirc}}-O-CH_2-CH_2-$$

with $R_1$ being H, $CH_3$, or X;

$-CH_2-CH_2-O-$⬡$-O-CH_2-CH_2-$ $-CH_2-CH_2-O-$⬡$-CH_2-CH_2-$⬡$-O-CH_2-CH_2-$

—⬡(H)—

$-CH_2-CH_2-O-$⬡⬡$-O-CH_2-CH_2-$
(H)

In preferred embodiments of the invention, liquid materials with low vapor pressure or solid materials are employed.

The polymers which can be employed are in general all polymers employed in formulating glues and hot-melt adhesives which contain in the chain at least one comonomer carrying a free carboxylic acid function. In certain embodiments of the invention, the copolymers of ethylene with ethylenically unsaturated monocarboxylic acids are desirably used. Preferred acids include acrylic acid, methacrylic acid, crotonic acid, cinnamic acid, and undecylenic acid.

Terpolymers of ethylene with vinyl or of acrylic comonomers wherein at least one of the comonomers carries free carboxylic functions are also utilized. Examples of such terpolymers are terpolymers of ethylene, vinyl acetate and acrylic acid, of ethylene, tertbutyl acrylate and acrylic acid, of ethylene, methacrylic acid and a methacrylate of an alkali metal, preferably sodium or potassium or an alkaline-earth metal, or zinc, and of ethylene, acrylic acid and vinyl chloride.

In general, it is possible to use any copolymer of ethylene with a monoethylenic monocarboxylic acid, and in certain preferred embodiments, acrylic acid, which contains between 1 and 50 percent of such an acid. In certain preferred embodiments, the copolymer contains from three to ten percent of the monocarboxylic acid. It is also possible to use terpolymers of ethylene, a monoethylenically unsaturated monocarboxylic acid, and an ester of a monoethylenically unsaturated monocarboxylic acid, or any other vinyl or acrylic comonomer, the content of the monoethylenic monocarboxylic acid being from one to 50 percent. In certain preferred embodiments, the monoethylenic monocarboxylic acid is from three to ten percent.

It is advantageous that the polymers to which divinyl ether is added be fairly fluid. Accordingly, it is desirable to use polymers with a flow index of between 1 and 100, and in certain preferred embodiments from 3 to 10 (being the index measured for ten minutes at 190° C. under a load of 2.16 kg, ASTM D-1238).

To evaluate the adhesive properties of the said compositions, the bonding produced on aluminum specimens is taken as an example. These bondings are produced at temperatures of between 200° and 250° C., preferably around 230° C., under various loads, 4 to 6 bars, over a defined period. The peel strength P, which measures the energy required to tear apart the assembly thus formed is determined with a dynamometer at temperatures ranging from ambient to 120° C.

The compositions of the present invention have peel strengths, P, which are four to five times greater than the peel strengths of resins which do not contain the divinyl ether. This improvement of adhesion of such resins is obtained with small quantities of divinyl ether of between 0.1 and 5 percent by weight, preferably between 0.5 and 2 percent by weight relative to the base resin. In certain preferred embodiments, the invention contemplates using from 0.5 to 2 percent with respect to the base resin. Such improvement in the adhesive properties of the compositions containing a polymer carrying free acid functions and a compound having at least two vinyl ether functions is attributed to the reaction of the acid functions with the vinyl ether functions, a reaction which results in crosslinking of the polymer carrying the acid functions.

The reaction of acids with vinyl ethers, which results in an ether/ester (or acylal) is, moreover, characterized by being thermoreversible, that is to say, when the temperature is raised, the acylal formed decomposes to reform the starting products. When this reaction is applied to a polymer, as is the case here, this means that when the temperature is raised, the divinyl ether crosslinking of the polymer carrying an acid function ceases and that, conversely, it suffices to lower the temperature for such crosslinking to reappear. Such crosslinking is herein denominated "thermoreversible".

This may be illustrated by the following diagram:

Thus, when a polymer of ethylene and acrylic acid is mixed in a Brabender Plastograph with a divinyl ether of the general structure $CH_2=CH-O-R-O-CH=CH_2$ having a sufficiently low vapor pressure to make it possible to work when the resin melts, it is found that the torque required to knead the polymer rises rapidly, thus showing an increase in the viscosity of the medium. This increase is faster or slower, depending on the number of esterified acid functions. This viscosity increase is due to the fact that the divinyl ether of the general structure shown above produces bridging between the polymer chains on which carboxylic functions are randomly grafted.

The compositions according to this invention can be manufactured by incorporating divinyl ether in the molten base polymer. Good kneading is required to obtain good homogenization and reaction completeness. It is desirable to operate at temperatures between 150° and 200° C. In preferred embodiments, polymers with good fluidity at around 160°–170° C. are used.

When the temperature of the mass which has become very viscous is raised, it is seen that the product again becomes fluid and goes toward the initial viscosity of the resin employed. In fact, when the temperature is increased, the inverse decomposition reaction is promoted and the acid and vinyl ether functions are regenerated. This can be readily shown by any analytical technique such as proton and carbon-13 NMR (nuclear magnetic resonance) or infrared spectroscopy.

The thermoreversibility temperature, $T_2$, is between 180° and 250° C., depending on the polymers and divinyl ethers employed. After cooling, but without reaching solidification, an increase in the viscosity is observed once again, measured as an increase in the Plastograph torque.

The thermoreversibility of the crosslinking has numerous advantages. When the composition is applied to a surface at a sufficiently high temperature, it becomes very fluid and permits good wetting of the substrate. After cooling, the joint is crosslinked. This crosslinking endowing the joint with very good mechanical properties, such as improved aging and solvent resistance and, as already said, better adhesion. Compositions according to the invention consequently make it possible to obtain simultaneously ease of application and good wetting of the substrate, which are usually the attributes of hot-melt adhesives containing high-fluidity polymers, while at the same time attaining the high adhesive performance which characterizes formulations based on high-viscosity polymers.

The compositions according to the invention can be prepared in any apparatus which ensures good kneading of the two constituents in the molten state. For instance, single or double screw extruders, roll mills, and the like can be used. The operation need only be conducted at a temperature such that there should be no risk of a blockage in the mixer due to excessive viscosity. Thus, in an extruder, the working temperature in the first zone of the screw is 160°–170° C. and the temperature is gradually increased towards the exit so as to lower the viscosity (by making use of thermoreversibility) to permit easy extrusion.

The compositions described in the following exam-

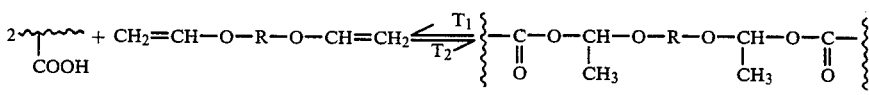

ples are produced with a Brabender Plastograph fitted with a type 50 roll mill of approximately 60 cm³ volumetric capacity. A quantity of resin containing from 1 to 50 percent weight, and preferably between 3 and 10 percent, of a monoethylenic monocarboxylic acid is weighed accurately. The resin is placed in the machine and then, after ten minutes kneading at the required temperature, the sensitivity scale is set to 0. Generally, the scale factor is chosen so that the entire curve can be recorded continuously.

The exact quantity of divinyl ether, which is between 0.1 and 5 percent, and preferably between 0.5 and 2 percent relative to the resin, is then added. Such weight percentage makes it possible to esterify a greater or lesser proportion of the free carboxylic functions in the resin. The best adhesion is obtained with a percentage of between 1 and 50 percent, and in certain preferred embodiments the adhesive contains from 1 to 25 percent of esterified acid functions.

A rapid torque increase is generally observed, and it reaches a maximum value after a few minutes. The test is stopped as soon as the crosslinked product shows a tendency to come out of the vessel. The product is then used to produce bond aluminum.

BONDING CONDITIONS

The bonding tests are carried out using a "welder" with variable-pressure, temperature-controlled jaws 25 mm wide and fitted with a timer.

The material employed as the bonding specimens is tempered aluminum sheet which is 110±10 μm thick and measures 120×120 mm. The aluminum is first degreased in an acetone bath.

A quantity of the adhesive to be tested is deposited on one side of an aluminum plate over a width of 25 mm, this plate is then covered with a second plate, and these two plates are then introduced accurately between the jaws of the welder.

Excess product is removed by the applied pressure. FIG. 1 shows an aluminum plate 10 used to produce the tensile test specimens. Plate 10 is coated with adhesive 11 to be tested in a width of 25 mm.

The bonding conditions are referred to in the accompanying Examples which illustrate the invention. The bonding temperature is between 200° and 250° C., and in certain preferred embodiments about 230° C., and corresponds to the temperature at which the chemical bonds are broken and the product is fluid.

Figure 2:
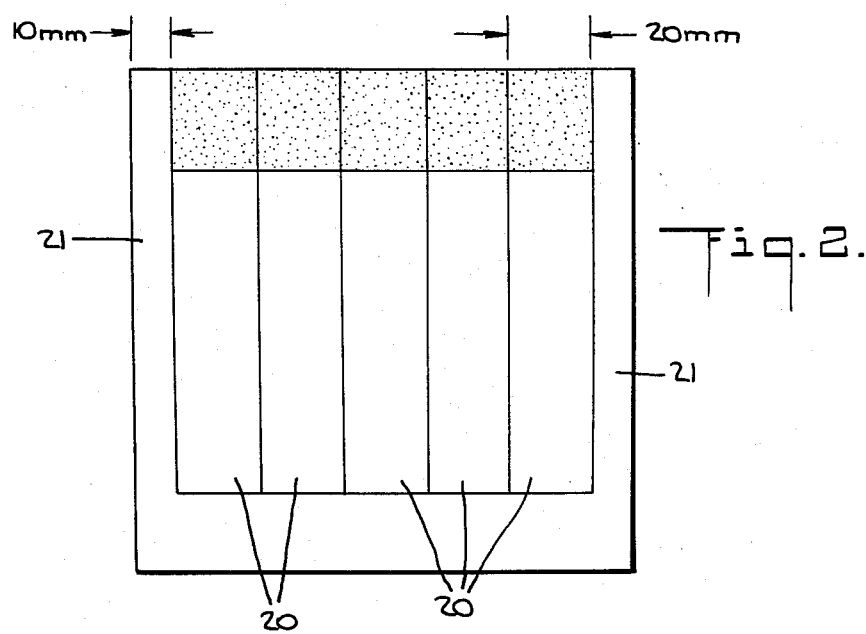
FIG. 2 is an illustration of specimens used to test bonding strength.

The preparation of the specimens for carrying out the measurement of peel strength, P, is carried out as follows. As shown in FIG. 2, aluminum plate 10 resulting from the deposition described above is cut into bonding specimens 20 which are 20 mm wide and 100 mm long. Five specimens of this type are made from the bonded plate, an edge 21 which is 10 mm in width being removed.

The procedure illustrated in FIG. 2 shows the method for producing the bonding test specimens. A minimum interval of 12 hours is then allowed between the bonding and the measurement of the peel strength.

MEASUREMENT OF THE PEEL STRENGTH, P

The tensile force is applied with a Lhomargy Model DY 07 dynamometer at temperatures from 20° to 120° C.

Figure 3:
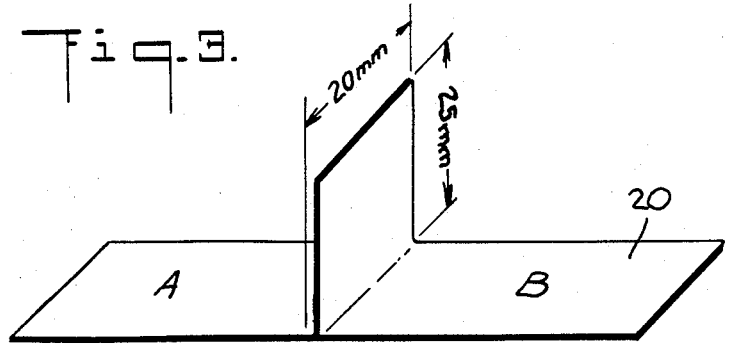
FIG. 3 shows a specimen in the test fixture.

The free ends A and B of specimen strip 20 are placed in the jaws of the tensile testing machine (FIG. 3). The desired temperature is attained, and the machine jaws are then separated at a constant speed of 50 mm a minute.

A recorded curve shows the force required to break the adhesive bond.

The peel strengths, P, are expressed in decanewtons per centimeter (daN/cm).

The following Examples are given to illustrate embodiments of the invention as it is presently preferred to practice it. It will be understood that these Examples are illustrative, and the invention is not to be considered as restricted thereto except as indicated in the appended claims.

EXAMPLES I to V

Prpduction of Compositions with Improved Adhesive Properties

The oil temperature of a Brabender Plastograph is adjusted so as to obtain 165° C. in the reaction vessel, and the speed of rotation of the blades is 60 revolutions per minute.

When the temperature of 165° C. has been attained, 45 parts of terpolymer A (Resin A), prepared from 89 percent ethylene, 7 percent tert-butyl acrylate, and 4 percent acrylic acid is added. This resin has a density of 0.926 and a flow index of 6.5 g/10 minutes.

After 10 minutes of mixing at 165° C., the torque scale is set to 0 and 1.775 parts of butanediol divinyl ether, $CH_2=CH-O-(CH_2)_4-O-CH=CH_2$, is added rapidly. This corresponds to 3.8 percent by weight of divinyl ether in the composition. The Plastograph reading rises very rapidly from 0 to 560.

The test is stopped. The product obtained is used to produce adhesive bonds on aluminum.

Other compositions are produced by varying the quantity of butanediol divinyl ether.

The following compositions are also produced:

Example II: 45 parts of Resin A and 0.9 part of butanediol divinyl ether

Example III: 45 parts of Resin A and 0.45 part of butanediol divinyl ether

Example IV: 45 parts of Resin A and 0.22 part of butanediol divinyl ether

Example V: 45 parts of Resin A and 0.11 part of butanediol divinyl ether.

Bonding tests are carried out with the above-mentioned compositions according to the conditions described in Table 1. The traction tests are carried out at 80° C.

The results obtained are set forth in Table 1. For comparison, virgin Resin A is used to provide a joint and the peel strength is measured. It can be seen that the compositions obtained with butanediol divinyl ether have peel strengths, P, which are three to four times greater than that of Resin A.

The best result is obtained with one percent of butanediol divinyl ether (Example III), and this corresponds to 25 percent of the acid functions esterified.

Other bonding and traction conditions are carried out with the compositions of Examples IV and V, and the results are shown in Table 2.

It is found that under these conditions the composition of Example IV, which contains 0.5 percent of butanediol divinyl ether has a peel strength, P, approximately four times greater than the strength, P, of Resin A without additive.

EXAMPLES VI to IX

Compositions with Resin A and diethylene glycol divinyl ether, $CH_2=CH-O-CH_2-CH_2-O-CH-$ 2—CH$_2$—O—CH=CH$_2$ (DEGDVE), are produced at 165° C., in the same apparatus as described in Example I.

Sixty parts of Resin A are introduced into the Plastograph vessel, heated to 165° C., and then, after ten minutes, 1.3 parts of DEGDVE are rapidly added. This corresponds to 2.12 percent by weight of divinyl ether in the composition. The Plastograph torque rises from 0 to 920 in four minutes. The white product obtained is used to produce bonds on aluminum.

Other compositions are produced with Resin A and various contents of DEGDVE:

Example VII: The composition contains 1.07 percent by weight of DEGDVE

Example VIII: The composition contains 0.5 percent by weight of DEGDVE

Example IX: The composition contains 0.3 percent by weight of DEGDVE

The bonding tests are carried out with the compositions of Examples VI, VII, VIII and IX according to the conditions described in Table 3.

The traction tests are carried out at 50° C. and 80° C. The results are set out in Table 3. The best result is obtained with 0.5 percent of DEGDVE which theoretically corresponds to 12.5 percent of esterified acid functions. Good results are also obtained with one percent of divinyl ether, corresponding to approximately 25 percent of esterified acid functions.

EXAMPLES X to XIII

By following the procedure described in Example I, compositions are prepared with Resin B which is prepared from 93.5 percent ethylene and 6.5 percent acrylic acid.

This resin has a density of 0.932, a flow index of 5.5 g/10 minutes, and a Vicat point of 85° C.

The Plastograph vessel is heated to 175° C. and 45 parts of Resin B are introduced. After ten minutes at this temperature and after the scale has been set at 0, 1.68 cm$^3$ or 1.62 parts of diethylene glycol divinyl ether (DEGDVE) are added. This corresponds to 3.47 percent by weight of divinyl ether in the composition.

The Plastograph reading rises very rapidly to 550 (less than two minutes). The product obtained is used to produce bonds on aluminum.

Other compositions are produced with Resin B and decreasing contents of DEGDVE:

Example XI: The composition contains 1.79 percent by weight of DEGDVE

Example XII: The composition contains 0.90 percent by weight of DEGDVE

Example XIII: The composition contains 0.45 percent by weight of DEGDVE

Bonding and traction tests are carried out with the compositions of Examples X, XI, XII and XIII. The results and conditions of the tests are shown in Table 4.

The best results are obtained with a percentage of DEGDVE of below one percent by weight. Thus, with 0.97 percent, corresponding to 12.5 percent of esterified acid functions, a peel strength, P, of 4.90 daN/cm is obtained at 80° C. Force P is 1.44 daN/cm at 100° C., that is, more than four times greater than the strength of the virgin resin under the same conditions of bonding and traction.

EXAMPLES XIV to XVI

Compositions are prepared following the procedure described in Example I, with Resin B and 2,2-bis[p-(2-vinyloxyethoxy)phenyl]propane:

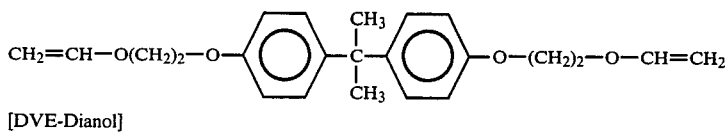

[DVE-Dianol]

The Plastograph vessel is heated to 174° C. and 45 parts of Resin B are introduced. After ten minutes at this temperature, 1.9 parts of DVE-Dianol are added. This corresponds to 4.05 percent by weight of divinyl ether in the composition.

The Plastograph reading rises to the 580 mark in less than three minutes. The product obtained is used to produce bonds on aluminum.

Other compositions were produced with Resin B and lower contents of DVE-Dianol:

Example XV: The composition contains 1.96 percent by weight of DVE-Dianol

Example XVI: The composition contains one percent by weight of DVE-Dianol

Bonding and traction tests are carried out with the compositions of Examples XIV, XV and XVI. The conditions and the results are shown in Table 5.

The best result is obtained with one percent of DVE-Dianol, which corresponds theoretically to 6.25 percent of esterified acid functions.

EXAMPLE XVII

A composition was prepared according to the procedure described in Example I by employing Surlyn 1652 (Surlyn is a trademark of E. I. duPont de Nemours), which is a terpolymer of ethylene, methacrylic acid and zinc methacrylate.

This resin has a flow index of 5, and a melting point of 95° C.

The Plastograph vessel is heated to 162° C., and 45 parts of this resin are introduced. After ten minutes at this temperature, 0.5 part of 2,2-bis[p-(2-vinyloxyethoxy)phenyl]propane (DVE-Dianol) is added.

This corresponds to 1.1 percent by weight of DVE-Dianol in the composition. The Plastograph reading rises to the 820 mark in three minutes 30 seconds.

The product obtained is used to produce bonds on aluminum. The conditions and results are shown in Table 6.

TABLE 1

ADHESIVE COMPOSITIONS BASED ON BUTANEDIOL DIVINYL ETHER

| Example | Percentage of divinyl ether in the composition | Percentage of esterified acid functions | Bonding conditions | | | Traction tests | |
|---|---|---|---|---|---|---|---|
| | | | Temperature (°C.) | Time (seconds) | Pressure (bars) | Temperature (°C.) | P (daN/cm) |
| Comparative | Resin A without Additive | 0 | 235 | 300 | 6 | 80 | 0.64 |
| I | 3.8 | 100 | 235 | 300 | 6 | 80 | 0.91 |
| II | 1.9 | 50 | 235 | 300 | 6 | 80 | 1.29 |
| III | 1 | 25 | 235 | 300 | 6 | 80 | 2.06 |
| IV | 0.5 | 12.5 | 235 | 300 | 6 | 80 | 1.15 |
| V | 0.25 | 6.25 | 235 | 300 | 6 | 80 | 1.02 |

TABLE 2

ADHESIVE COMPOSITIONS BASED ON BUTANEDIOL DIVINYL ETHER

| Example | Percentage of divinyl ether in the composition | Percentage of esterified acid functions | Bonding conditions | | | Traction tests | |
|---|---|---|---|---|---|---|---|
| | | | Temperature (°C.) | Time (seconds) | Pressure (bars) | Temperature (°C.) | P (daN/cm) |
| Comparative | Resin A | 0 | 230 | 300 | 4 | 50 | 1.31 |
| V | 0.25 | 6.25 | 230 | 300 | 4 | 50 | 2.16 |
| IV | 0.5 | 12.5 | 230 | 300 | 4 | 50 | 5.05 |

TABLE 3

ADHESIVE COMPOSITIONS BASED ON DIETHYLENE GLYCOL DIVINYL ETHER

| Example | Percentage of divinyl ether in the composition | Percentage of esterified acid functions | Bonding conditions | | | Traction tests | |
|---|---|---|---|---|---|---|---|
| | | | Temperature (°C.) | Time (seconds) | Pressure (bars) | Temperature (°C.) | P (daN/cm) |
| Comparative | Resin A without additive | 0 | 230 | 300 | 4 | 50 | 1.3 |
| VI | 2.12 | 50 | 240 | 300 | 4 | 50 | 3.43 |
| VII | 1.07 | 25 | 240 | 300 | 4 | 50 | 4.38 |
| VIII | 0.5 | 12.5 | 240 | 300 | 4 | 50 | 4.68 |
| IX | 0.3 | 7.5 | 230 | 300 | 4 | 50 | 4.13 |
| Comparative | Resin A without Additive | 0 | 235 | 300 | 6 | 80 | 0.64 |
| VII | 1.07 | 25 | 230 | 300 | 6 | 80 | 2.31 |
| VIII | 0.5 | 12.5 | 230 | 300 | 6 | 80 | 2.31 |

TABLE 4

ADHESIVE COMPOSITIONS BASED ON DIETHYLENE GLYCOL DIVINYL ETHER

| Example | Percentage of divinyl ether in the composition | Percentage of esterified acid functions | Bonding conditions | | | Traction tests | |
|---|---|---|---|---|---|---|---|
| | | | Temperature (°C.) | Time (seconds) | Pressure (bars) | Temperature (°C.) | P (daN/cm) |
| Comparative | Resin B without additive | 0 | 245 | 300 | 6 | 80/100 | 1.37/0.31 |
| X | 3.47 | 50 | 245 | 300 | 6 | 80 | 0.406 |
| XI | 1.79 | 25 | 245 | 300 | 6 | 80 | 1.45 |
| XII | 0.90 | 12.5 | 245 | 300 | 6 | 80/100 | 4.90/1.44 |
| XIII | 0.45 | 6.25 | 245 | 300 | 6 | 80/100 | 3.95/2.11 |

TABLE 5

ADHESIVE COMPOSITIONS BASED ON 2,2-BIS[p-(2-VINYLOXYETHOXY)PHENOL]PROPANE

| Example | Percentage of divinyl ether in the composition | Percentage of esterified acid functions | Bonding conditions | | | Traction Tests | |
|---|---|---|---|---|---|---|---|
| | | | Temperature (°C.) | Time (seconds) | Pressure (bars) | Temperature (°C.) | P (daN/cm) |
| Comparative | Resin B without additive | 0 | 245 | 300 | 6 | 80/100 | 1.37/0.31 |
| XIV | 4.05 | 25 | 230 | 300 | 6 | 80 | 0.48 |
| XV | 1.96 | 12.5 | 230/250 | 300 | 6 | 80 | 2.94/3.63 |
| XVI | 1 | 6.25 | 230 | 300 | 6 | 80/100 | 5.81/3.19 |
| XVI | 1 | 6.25 | 230 | 300 | 6 | 120 | 0.77 |

TABLE 6

ADHESIVE COMPOSITION BASED ON 2,2-BIS[p-(2-VINYLOXYETHOXY) PHENYL]PROPANE, (DVE-DIANOL)

| Example | Percentage of divinyl ether in the composition | Bonding conditions | | | Traction tests | |
|---|---|---|---|---|---|---|
| | | Temperature (°C.) | Time (seconds) | Pressure (bars) | Temperature (°C.) | P (daN/cm) |
| Comparative | Surlyn without DVE-D | 150 | 300 | 6 | 80 | 1.91 |
| XVII | 1.1 | 230 | 300 | 6 | 80 | 2.6 |

What is claimed is:

1. An adhesive composition with thermoreversible crosslinking prepared by the reaction of the vinyl ether functions of a divinyl ether having the formula $CH_2=CH-O-R-O-CH=CH_2$, wherein R is aliphatic, aromatic or cycloaliphatic, with the carboxyl functions of polymer produced by the polymerization of an olefin with an ethylenically unsaturated monocarboxylic acid, the quantity of the divinyl ether being from 0.1 to 5 percent by weight and the quantity of polymer being from 99.9 to 95 percent by weight.

2. A composition according to claim 1, wherein the polymer is a copolymer of the olefin and the ethylenically unsaturated monocarboxylic acid.

3. A composition according to claim 1, wherein the polymer is a terpolymer of the olefin, the ethylenically unsaturated monocarboxylic acid, and an ester of the ethylenically unsaturated monocarboxylic acid.

4. A composition according to claim 1, wherein the quantity of divinyl ether is 0.5 to 2 percent by weight and the quantity of polymer is 99.5 to 98 percent by weight.

5. A composition according to claim 1, wherein the divinyl ether is ethylene glycol divinyl ether, butanediol divinyl ether, or 2,2-bis[p-(2-vinyloxyethoxy)phenyl]propane.

6. A composition according to claim 1, wherein the polymer has a flow index of 1 to 100 grams per ten minutes.

7. A composition according to claim 1, wherein the carboxylic acid copolymerized with the olefin is acrylic, methacrylic or crotonic acid and the carboxylic acid comprises one to 50 percent by weight of the polymer.

8. A composition according to claim 1, wherein the polymer is selected from the group consisting of ethylene-acrylic acid copolymer and ethylene-tertbutyl acrylate-acrylic acid terpolymer.

9. A composition according to claim 1, wherein the polymer has a part of its carboxylic functions converted to the calcium or zinc salt.

10. A process for manufacturing compositions according to claim 1, which process comprises kneading the divinyl ether and polymer together at temperatures from 150° to 200° C.

* * * * *

UNITED STATES PATENT AND TRADEMARK OFFICE
CERTIFICATE OF CORRECTION

PATENT NO. : 4,617,354

DATED : October 14, 1986

INVENTOR(S) : DANIEL AUGUSTIN ET AL

It is certified that error appears in the above-identified patent and that said Letters Patent is hereby corrected as shown below:

Column 6, line 13, correct the spelling of "Production".

Column 10, Table 5, in the title change "PHENOL" to --PHENYL--.

Column 11, line 20, insert "a" between "of" and "polymer".

Signed and Sealed this

Thirty-first Day of March, 1987

Attest:

DONALD J. QUIGG

Attesting Officer        Commissioner of Patents and Trademarks